United States Patent [19]
Choi

[11] Patent Number: 5,636,190
[45] Date of Patent: Jun. 3, 1997

[54] OPTICAL PICKUP SYSTEM FOR USE WITH AN OPTICAL DISK HAVING MULTIPLE REFLECTION HOLOGRAM FILM

[75] Inventor: Yang-Oh Choi, Seoul, Rep. of Korea

[73] Assignee: Daewoo Electronics Co., Ltd., Seoul, Rep. of Korea

[21] Appl. No.: 440,798

[22] Filed: May 15, 1995

[30] Foreign Application Priority Data

May 13, 1994 [KR] Rep. of Korea ............... 94-10430

[51] Int. Cl.⁶ ........................................... G11B 7/09
[52] U.S. Cl. ............... 369/44.23; 369/44.37; 369/44.41; 369/94
[58] Field of Search ............... 369/44.23, 44.37, 369/44.41, 103, 109, 112, 94, 44.26

[56] References Cited

U.S. PATENT DOCUMENTS

| | | | |
|---|---|---|---|
| 4,904,856 | 2/1990 | Nagahama et al. | 250/201.5 |
| 4,908,813 | 3/1990 | Ojima et al. | 369/94 |
| 4,918,300 | 4/1990 | Tsuji et al. | 369/44.37 |
| 5,381,401 | 1/1995 | Best et al. | 369/94 |
| 5,408,453 | 4/1995 | Holtslag et al. | 369/44.37 |

*Primary Examiner*—W. R. Young
*Attorney, Agent, or Firm*—Anderson Kill & Olick P.C.

[57] ABSTRACT

An optical pickup system for regenerating information stored on a hologram disk including a pair of recording surfaces thereon, includes a first and a second light sources, an optical detection unit having a first and a second detectors, a diffraction device including a crystal base, a first and a second diffraction elements, a beam splitter, disposed between the first detector and the hologram disk, an objective lens, disposed between the beam splitter and the hologram disk, and a signal detection unit having a first and a second signal detection circuits, wherein the second light source is used for reproducing a regenerated information signal on the second recording surface of the hologram disk and the first light source is used for detecting a tracking error and a focusing error off the first recording surface of the hologram disk.

6 Claims, 6 Drawing Sheets

OPTICAL PICKUP SYSTEM FOR USE WITH AN OPTICAL DISK HAVING MULTIPLE REFLECTION HOLOGRAM FILM

FIELD OF THE INVENTION

The present invention relates to an optical pickup system; and, more particularly, to a novel optical pickup system capable of driving an optical disk with a plurality of reflection surfaces.

DESCRIPTION OF THE PRIOR ART

There is shown in FIG. 1 an optical pickup system 10 capable of reproducing a signal from an information storage area on a conventional optical information recording disk, as disclosed in U.S. Pat. No. 5,111,449, entitled "Optical Pick-up Device Using Diffraction Grating Element Having Two Sub-regions", which is incorporated herein by reference. The optical pickup system 10 comprises a light source 12, a first and a second diffraction elements 14, 16, a collimator lens 18, an object lens 20, an optical disk 22 and an optical detector 24, wherein the first diffraction element 14, mounted in proximity of the light source 12, produces three beams which are irradiated on the optical disk 22 through the collimator lens 18 and the object lens 20. The three beams are then reflected back and impinge upon the second diffraction element 16, mounted in proximity of the optical disk 22, through the object lens 20 and the collimator lens 18, and then diffracted into the optical detector 24 by the second diffraction element 16.

One of the major difficulties of the above-described optical pickup system 10 lies in the shortage of information recording area. To overcome this problem, use of an optical disk having a multiple number of information storage layers has been proposed. In FIG. 2, there is shown a cross sectional view of an optical disk with a pair of reflection hologram films 34, 38, often referred to as a hologram disk, for use in an optical pickup system, disclosed in a copending commonly owned application, U.S. Ser. No. 08/340,941, now abandoned, entitled "Optical Disk with a Reflection Hologram Film and Method of Manufacturing the Same". The hologram disk 30 comprises a substrate 32, a first reflection hologram film 34, a transparent intermediate layer 36, a second reflection hologram film 38 and a transparent protective layer 40, wherein each of the first and the second reflection hologram films is capable of reflecting the light beam of a certain wavelength and letting others pass through. As shown, a light beam I having a wavelength $\lambda_1$ from the optical pickup system is passed through the transparent protection layer 40, the second reflection hologram film 38 and the transparent intermediate layer 36 to reach the first reflection hologram film 34; and reflected back to the optical pickup system. On the other hand, a light beam II having a wavelength $\lambda_2$ from the optical pickup system is passed through the transparent protection layer 40 to reach the second reflection hologram film 38; and reflected back to the optical pickup system to thereby double the information storage area in comparison with the conventional optical disk which consists of only one layer for such reflecting, wherein each of the photoelectric cells is connected to signals from the photoelectric cells to electric signals, to thereby produce a focusing error signal, a tracking error signal and a regeneration information signal.

SUMMARY OF THE INVENTION

It is, therefore, a primary object of the present invention to provide a novel optical pickup system capable of operating a hologram disk.

In accordance with the present invention, there is provided an optical pickup system for recording onto a hologram disk including a pair of recording surfaces thereon, each of the recording surfaces having a plurality of tracks aligned in a tangential direction to the hologram disk, comprising: a pair of light sources for generating a first and a second light beams, each of the light sources being perpendicular to each other, each of the light beams having different wavelengths, wherein the first light source is placed on the opposite side of the hologram disk; an optical detection unit having a first and a second detectors, each of the detectors being perpendicular to each other, the first detector having five photoelectric cells and the second detector having one photoelectric cell, each of the photoelectric cells being capable of measuring a light beam intensity and generating a corresponding output in form of a light beam intensity, wherein the first detector being placed on the opposite side of the hologram disk used for the first light beam, and the second detector, for the second light beam; a diffraction device, disposed between the first light source and the hologram disk, including a crystal base, a first and a second diffraction elements, the first diffraction element being provided with a plurality of diffraction grooves for dividing the light beam emitted from the light source into three beams, and for transmitting the three beams onto the recording surface, wherein the direction of the diffraction grooves is parallel to a radial direction of the hologram disk, the radial direction being perpendicular to the tangential direction, the second diffraction element being provided with two sub-diffracting portions divided by a radial division line for reflecting the three beams diffracted from the first recording surface to the first detector, the two sub-diffracting regions having different pitches for diffracting the three beams in different angles; a beam splitter, disposed between the diffraction device and the hologram disk, provided with a reflection surface for transmitting the first light beam emitted from the first light source to the first recording surface, and for reflecting the second light beam emitted from the second light source to the second recording surface, wherein the reflection surface is positioned in inclined with respect to an optical axis of the light beam reflected from each of the recording surfaces, wherein the optical axis is perpendicular to the tangential and the radial direction of the hologram disk; a diffraction grating disposed between the second light source and the beam splitter, provided with a plurality of diffraction grooves for impinging the light beam reflected from hologram disk into a reception surface of the second detector, wherein the grooves therein aligned with those of the second diffraction element; an objective lens, disposed between the beam splitter and the hologram disk, for focusing each of the light beams reflected by the beam splitter on each of the recording surfaces and for converging each of the light beams reflected from each of the recording surfaces onto the diffraction grating and the second diffraction element of the diffraction device, respectively; and a signal detection unit having a first and a second signal detection circuits, the first signal detection circuit including an adder, and a first and a second subtractors, for converting output signals from the photoelectric cells to electrical signals, to thereby produce a focusing error, a tracking error and a regeneration information signal, wherein the second signal detection circuit is used for detecting the regeneration information signal of the second recording surface.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENT

Figure 1:
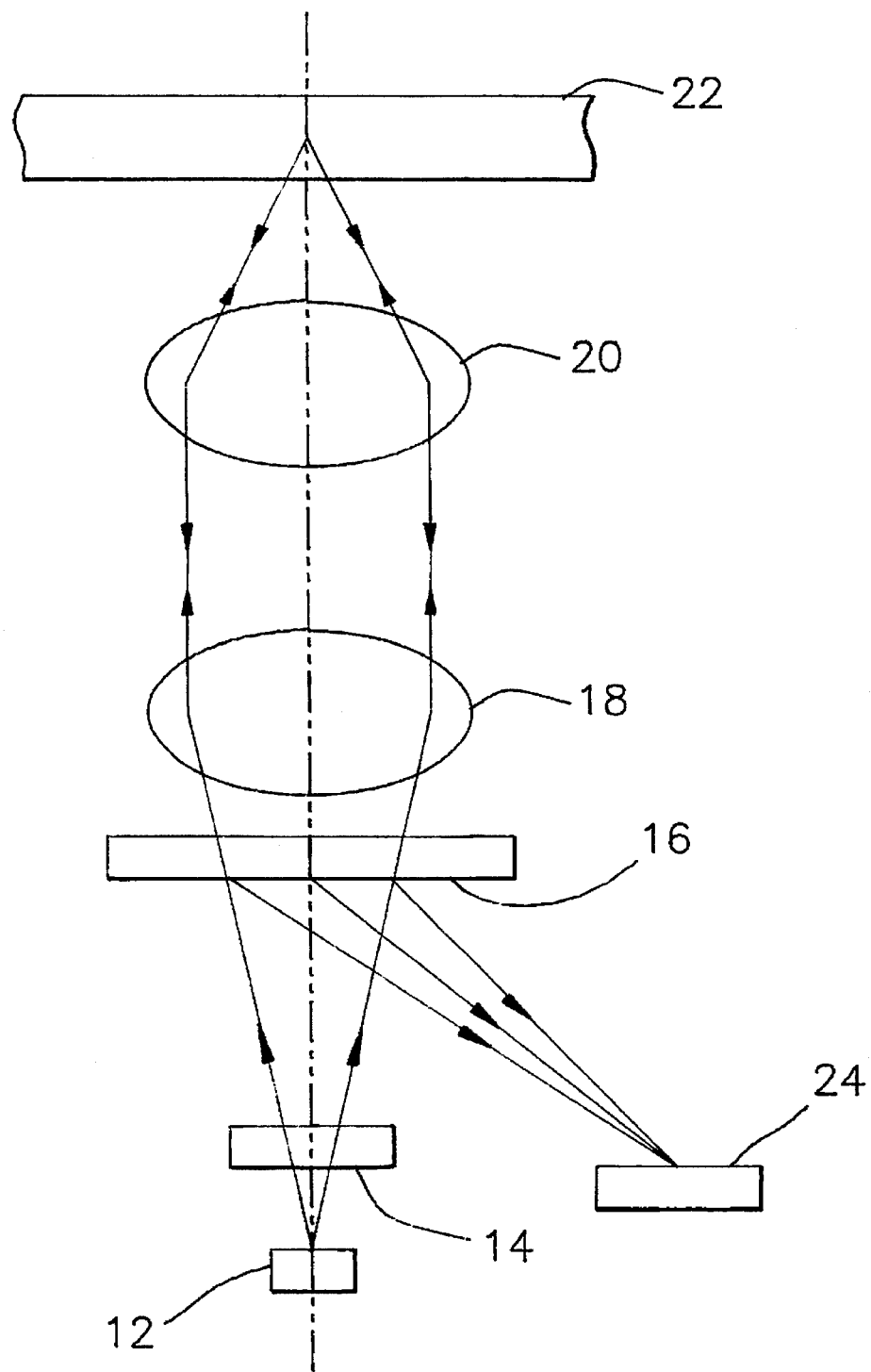
FIG. 1 represents a schematic side view of a prior art optical pickup system.
Figure 2:
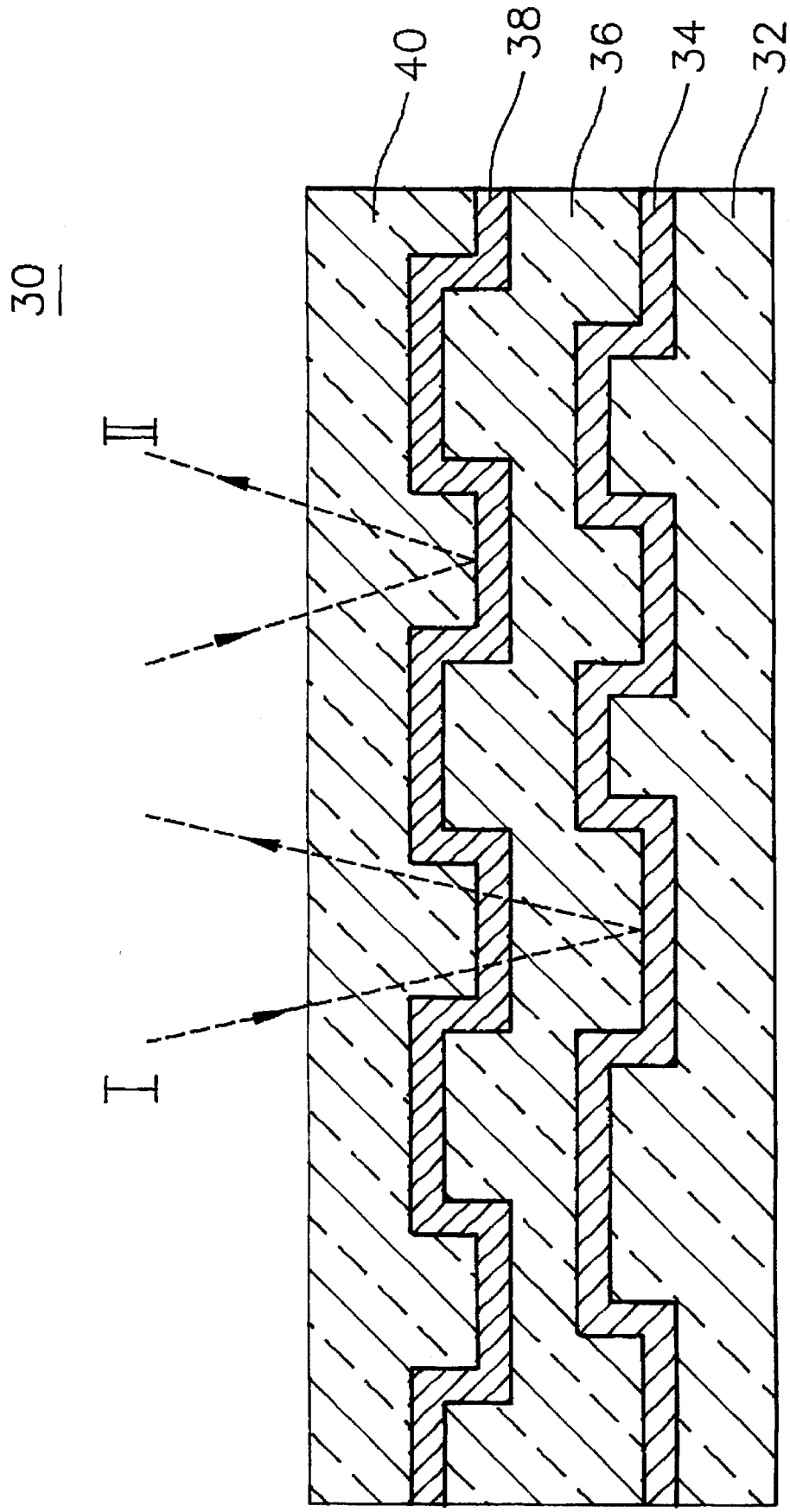
FIG. 2 illustrates a cross sectional view of an optical disk with a reflection hologram film.

There are illustrated in FIGS. 3 to 7 various views of the inventive optical pickup system in accordance with a preferred embodiment of the present invention. It should be noted that like parts appearing therein have like reference numerals.

Figure 3:
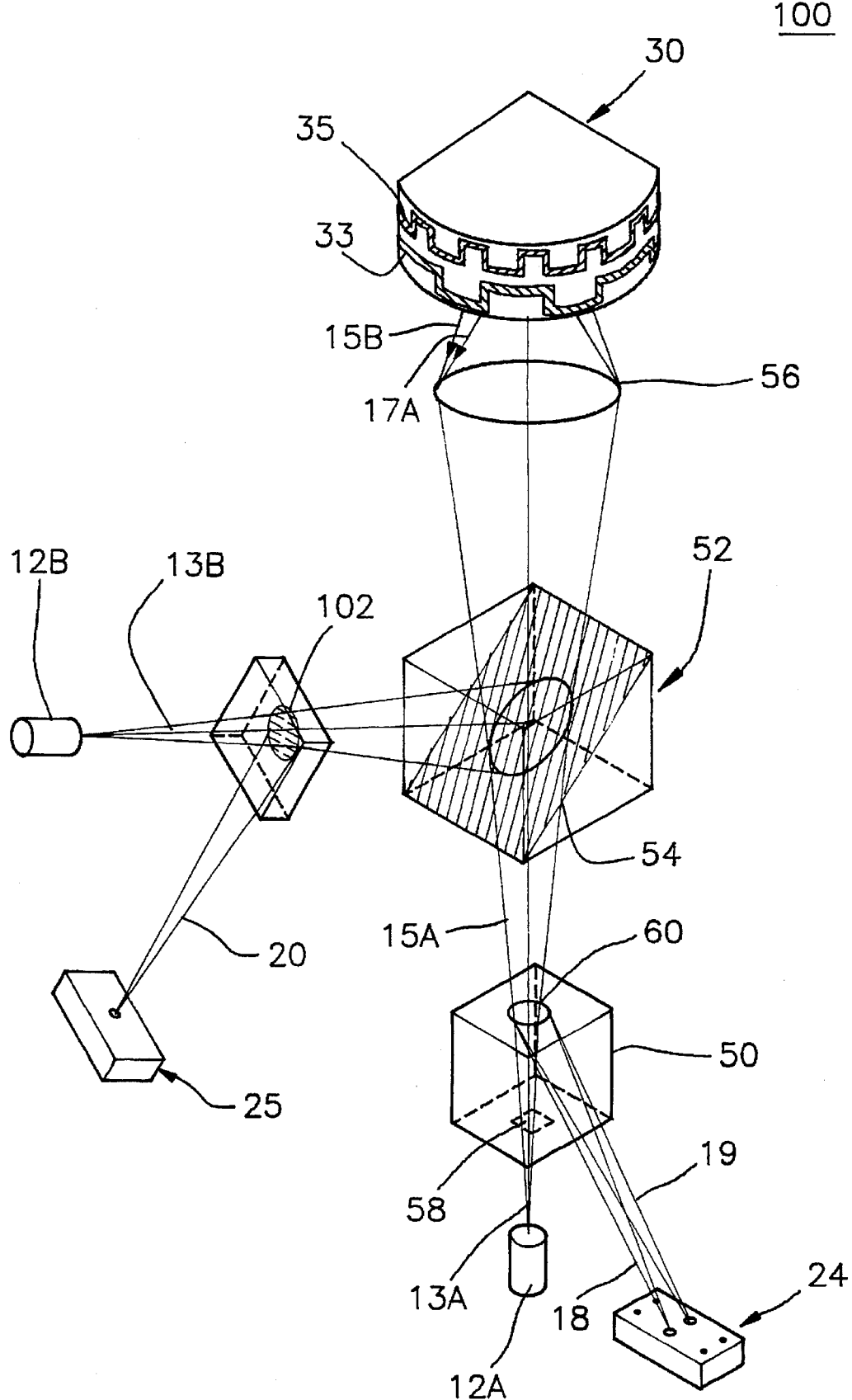
FIG. 3 depicts a perspective view of an optical pickup system in accordance with a preferred embodiment of the present invention.
Figure 4:
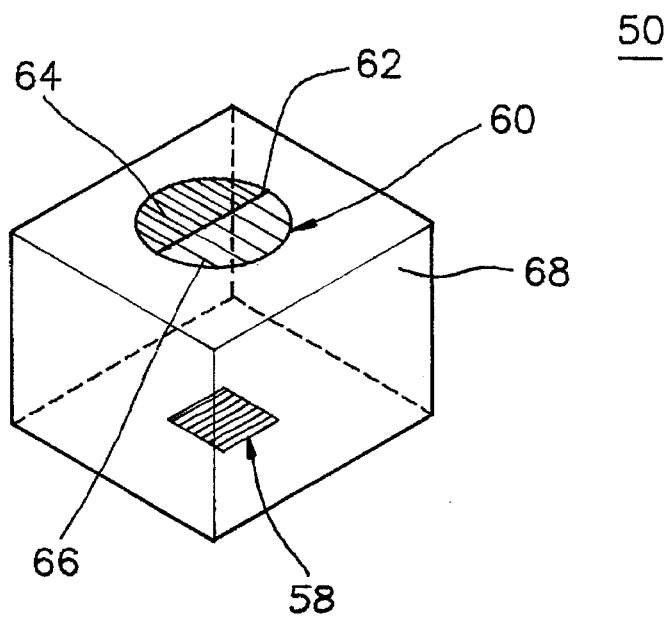
FIG. 4 presents a detailed perspective view of the diffraction device in the optical pickup system shown in FIG. 3.
Figure 5:
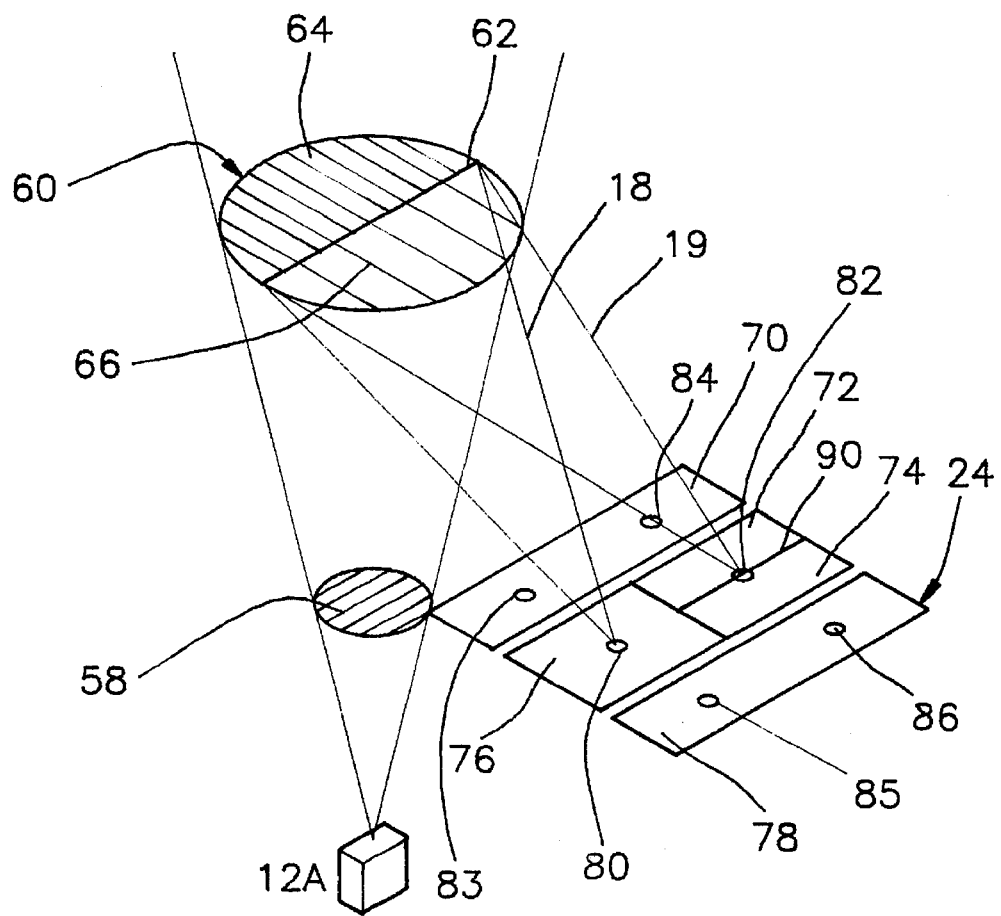
FIG. 5 offers a perspective view showing an optical detector and a diffraction device in the optical pickup system shown in FIG. 3.

As shown in FIG. 3 the optical pickup system 100 in accordance with the present invention comprises a first and a second light sources 12A, 12B, each of the light sources having different wavelengths, e.g., $\lambda_1$, $\lambda_2$, a diffraction device 50, a diffraction grating 102, a beam splitter 52, an objective lens 56, a hologram disk 30 including a first and a second reflection surfaces 33, 35 thereon and a first and a second detectors 24, 25, the first detector 24 including a first, a second, a third, a fourth and a fifth photoelectric cells and the second detector 25 having one photoelectric cell. In the system 100, while the first light source 12A reproduces a signal on the first recording surface 33 of the hologram disk 30, the second light source 12B is turned off. A light beam 13A emitted from the first light source 12A, e.g., a laser diode, enters a first diffraction element 58 of the first diffraction device 50 and diffracts into three beams 15A. The three beams 15A is partially transmitted by a reflection surface 54 incorporated in the beam splitter 52 into the objective lens 56, and the objective lens 56 focus the three beams 15A on the first recording surface 33, wherein the first recording surface 33 reflects only the light beam 13A having the wavelength $\lambda_1$ emitted from the first light source 12A, and the first recording surface 33 is transparent to other light beams having different wavelengths. The reflected three beams 17A are then back to a second diffraction element 60 of the first diffraction device 50 through the objective lens 56 and the reflection surface 54 of the beam splitter 52. The second diffraction element 60 diffracts the reflected three beams 17A into a pair of 0 and +/−1 order diffracted beams, since the second diffraction element 60 provided with a pair of sub-diffracting portions, each having a different grating pitch as shown in FIGS. 4 and 5. Each of the divided zero order diffracted beams are represented by 18 and 19. Other beams are not shown herein, for the sake of the clarity and brevity.

Conversely, when the second detector 25 reads the regeneration information signal off the second recording surface 35 of the hologram disk 30, the second light source 12B is turned on. In order to read the focusing error and the tracking error from the first recording surface 33 of the hologram disk 30, the first light source 12A is also turned on. In this case, the light beam 13B emitted from the second light source 12B, e.g., a laser diode, enters the beam splitter 52, and is partially reflected by a reflection surface 54 incorporated in the beam splitter 52 into the objective lens 56. The light beam 13B passes through the first recording surface 33, which is transparent to the light beams having a wavelength other than $\lambda_1$, and impinges onto the second recording surface 35 through the objective lens 56. A reflected light beam 15B from the second recording surface 35 is reflected back to a diffraction grating 102 through the objective lens 56 and the reflection surface 54. The diffraction grating 102 diffracts the reflected light beam 15B into 0 and +/−1 order diffracted beams. The second detector 25 is disposed at a position such that the first order diffracted beam 20 impinges onto the reception surface thereof, to thereby allow the detection of the regeneration information signal on the second recording surface 35 of the hologram disk 30. Other beams are not shown, for the sake of the simplicity. It should be noted that if the second detector is disposed at the position on which said −1 order diffracted beam impinges onto the reception surface thereof, said −1 order diffracted beam can be also used for detecting the regeneration information signal from the second recording surface.

Referring to FIG. 4, the first diffraction device 50 comprises the first and second diffraction elements 58, 60 and a crystal base 68, wherein the second diffraction element 60 is further provided with a first and a second sub-diffracting portions 64, 66 which are divided by a division line 62, the division line 62 being parallel to the radial direction of the hologram disk 30 and perpendicular to the track direction (that is, the tangential direction) of the hologram disk 30. Grating grooves formed on each of the sub-diffracting portions 64, 66 have a predetermined pitch, and the grooves are orthogonal to the division line 62, to form a number of parallel lines extending in the radial direction. Moreover, the pitches of the second sub-diffracting portion 66 is set to be greater than those of the first sub-diffracting portion 64. The crystal base 68 is made of a transparent material, e.g., PMMA(Polymethyl meta acryllrate) or PC(Polycarbonate).

Referring to FIG. 5, there is illustrated a detailed perspective view of the diffraction device 50 and the first detector 24 in FIG. 3. As shown in FIG. 5, the second diffraction element 60 is divided into a pair of sub-diffracting portions 64, 66 that are delineated by a division line 62 and whereon each of the grooves are respectively formed. The grooves on the sub-diffracting portions 64, 66 have mutually different pitches and the direction thereof are orthogonal to the division line 62. That is, the direction of the division line 62 is set so as to coincide with the radial direction of the hologram disk 30. The detector 24 divided into five photoelectric cells 70, 72, 74, 76 and 78. The three beams 15A reflected from each of the reflecting surfaces 33, 35 of the hologram disk 30 impinge onto the second diffraction element 60. The reflected three beams 17A are diffracted into a pair of 0 and +/−1 order diffracted beams by the sub-diffracting portions 64, 66. In the preferred embodiment of the invention, the first detector 24A is disposed at a position for receiving +1 or −1 order beams of the reflected three beams 17A diffracted by the sub-diffracting element 60. For example, light beam intensity distributions 80, 83, 85 are +1 order beams diffracted by the sub-diffracting portion 66 and the light beam intensity distributions 82, 84, 86 are +1 order beams diffracted by the sub-diffracting portion 64.

Specifically, in the above arrangement, when 0 and +/−1 order three beams 15A from the first light source 12A is precisely focused on each of the recording surfaces 33, 35 of the hologram disk 30, a portion of the returned three beams 17A is diffracted by the first sub-diffracting portions 64 of the second diffracting element 60A, to thereby produce a +1 order diffracted light 19. This +1 order diffracted light 19 is focused on the division line 90 separating the photoelectric cells 72 and 74, to form a light beam intensity distribution 82. Another portion of the zero order diffracted beam is diffracted in the sub-diffracting portion 66, to thereby produce +1 order diffracted light 18. This first order diffracted light 18 is focused on the photoelectric cell 76 to form a light beam intensity distribution 80. The −1 order diffracted light included in the three reflected three beams 17A is diffracted by the sub-diffracting portions 66 and 64 to form a pair of light beam intensity distributions 83, 84 on the photoelectric cell 70, respectively. The +1 order diffracted light of the reflected three beams 17A is diffracted by the sub-diffracting portions 66 and 64 to form a pair of light beam intensity distributions 85, 86 on the photoelectric cell 78, respectively.

Figure 6A:
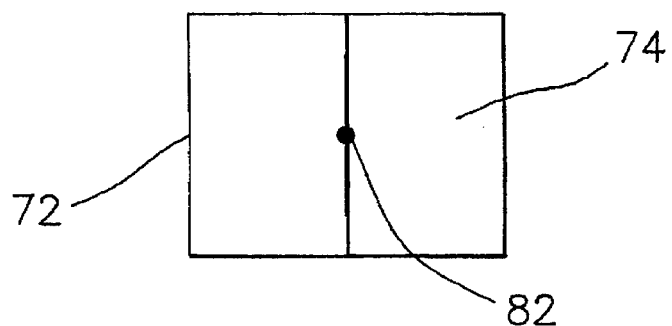
FIGS. 6A–6C exemplify the cross sectional luminous intensity distribution of the light beam impinging onto the reception surface of the detector.
Figure 6B:
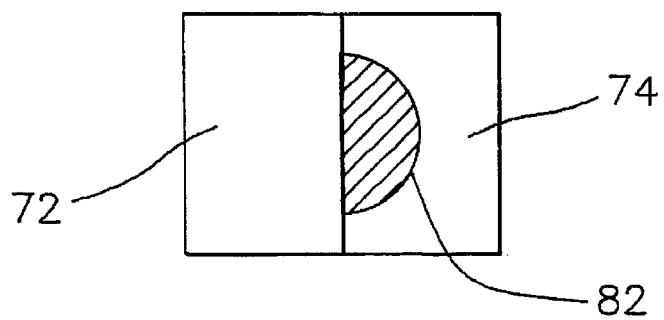
Figure 6C:
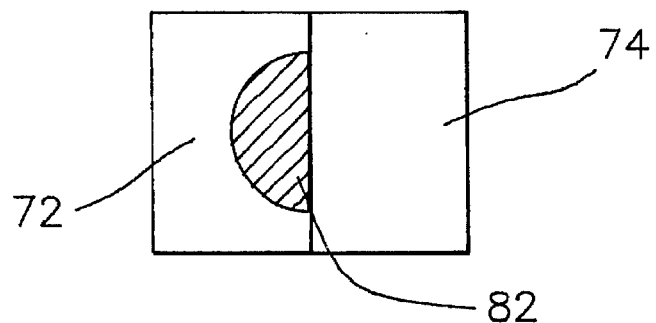

FIG. 6A shows the cross-sectional views of the light beam intensity distribution 82 impinging on the second and the third photoelectric cells when the hologram disk 30 is placed at a just focussed position which generates a zero focusing error signal. If the hologram disk 30 moves away from the just focussed position, i.e., from the objective lens 56, the light beam intensity distribution 82 being imaged on the second and the third photoelectric cells 72, 74 is shown in FIG. 6B. In the case when the hologram disk 30 moves closer to the objective lens 56, the light beam intensity distribution 82 being imaged on the second and the third photoelectric cells 72, 74, as illustrated in FIG. 6C.

Figure 7:
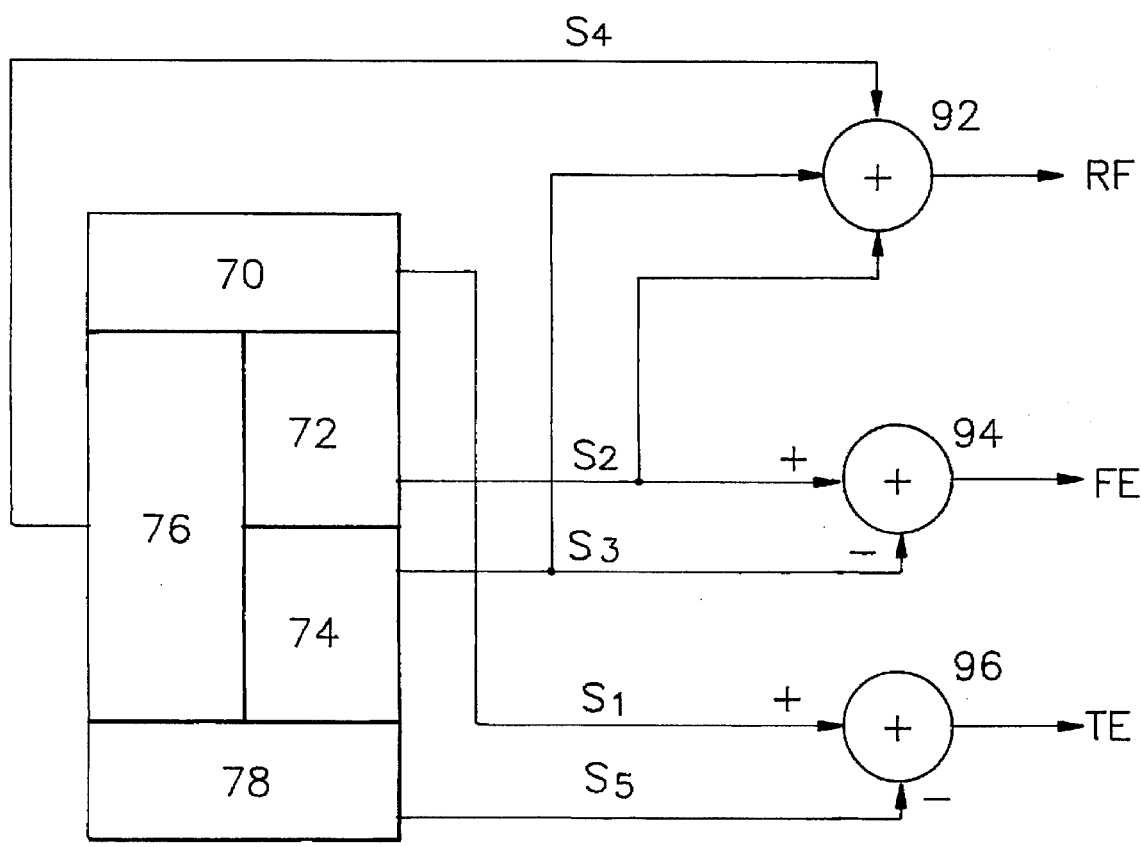
FIG. 7 is a block diagram showing the signal detection circuit in accordance with the present invention.

Referring to FIG. 7, supposing that $S_1$ to $S_5$ represent output signals from the photoelectric cells 70, 72, 74, 76 and 78, respectively, the focusing error signal(FE) may be obtained from a first subtractor 94 which subtracts one of the output signals $S_2$, $S_3$ from the other. The tracking error signal(TE) may be obtained from a second subtractor 96 which subtracts one of the output signals $S_1$, $S_5$ from the other and the regeneration information signal(RF) may be obtained from an adder 92 which sums the output signals $S_2$, $S_3$ and $S_4$.

As described above, therefore, the inventive optical pickup system utilizing a pair of light sources can be used in a hologram disk.

While the present invention has been described with respect to the preferred embodiments, other modifications and variations may be made without departing from the scope of the present invention as set forth in the following claims.

What is claimed is:

1. An optical pickup system for regenerating information signals stored on a hologram disk including a first and second recording surfaces thereon, each of the recording surfaces having a plurality of tracks aligned in a tangential direction to the hologram disk, comprising:

a pair of light sources for generating a first and a second light beams, each of the light beams having different wavelengths;

a diffraction device, disposed between the first light source and the hologram disk, including an orthorhombic crystal base with the first and second diffraction elements located on the sides facing each other, the first diffraction element being provided with a plurality of diffraction grooves for dividing the light beam emitted from the light source into three beams and for transmitting the three beams onto the first and the second recording surfaces, wherein each of the diffraction grooves is parallel to a radial direction of the hologram disk, the radial direction being perpendicular to the tangential direction, the second diffraction element being provided with two sub-diffracting portions divided by a radial division line for diffracting the three beams reflected from the first recording surface to a first detector, two sub-diffracting portions having grooves of which pitches are different for diffracting the three beams in different angles;

a beam splitter, disposed between the diffraction device and the hologram disk, provided with a reflection surface for transmitting the first light beam emitted from the first light source to the first recording surface and for reflecting the second light beam emitted from the second light source to the second recording surface, wherein the reflection surface is inclined with respect to an optical axis of the light beam reflected from each of the recording surfaces, wherein the optical axis is perpendicular to the tangential and the radial direction of the hologram disk;

a diffraction grating, disposed between the second light source and the beam splitter, provided with a plurality of diffraction grooves, for impinging the light beam reflected from the hologram disk onto a second detector;

an objective lens, disposed between the beam splitter and the hologram disk, for focusing each of the light beams passing through the beam splitter on each of the first and second recording surfaces and for converging each of the light beams reflected from each of the first and second recording surfaces onto the diffraction grating and the second diffraction element of the diffraction device, respectively;

the first detector having a plurality of photoelectric cells, each of the photoelectric cells being capable of measuring a light beam intensity and generating a corresponding output in the form of a light beam intensity;

the second detector having one photoelectric cell being capable of measuring a light beam intensity and generating a corresponding output in the form of a light beam intensity; and a signal detection unit having a first signal detection circuit and a second signal detection circuit for detecting the regenerated information signal off the second recording surface, the first signal detection circuit including an adder, and a first and a second subtractors, for converting output signals from the photoelectric cells to electrical signals and for producing a focusing error, a tracking error and a regenerated information signal off the first recording surface, wherein the first light source is used for reproducing the regenerated information signal off the first recording surface of the hologram disk, during which time the second light source is turned off, and also for detecting the tracking and focusing error signals, while the second light source is used for reproducing the regenerated information signal off the second recording surface of the hologram disk.

2. The optical pickup system of claim 1, wherein the first detector includes five photoelectric cells, the first and the fourth photoelectric cells are divided by a first tangential division line, the second and the third photoelectric cells are divided by a second tangential division line, the second and the fourth photoelectric cells are divided by a radial division line, the fourth and the fifth photoelectric cells are divided by a third tangential division line.

3. The optical pickup system of claim 1, wherein the second detector includes at least of one photoelectric cell.

4. The optical pickup system of claim 1, wherein the focusing error is obtained from the first subtractor which subtracts one of the output signals from the second and the third photoelectric cells from the other.

5. The optical pickup system of claim 1, wherein the tracking error is obtained from the second subtractor which subtracts one of the output signals from the first and the fifth photoelectric cells from the other.

6. The optical pickup system of claim 1, wherein the regeneration information signal is obtained from the adder which sums the output signals from the second, the third and the fourth photoelectric cells.

* * * * *